(12) United States Patent
Noh et al.

(10) Patent No.: US 8,903,405 B2
(45) Date of Patent: Dec. 2, 2014

(54) COMMUNICATION METHOD OF MACRO BASE STATION AND MICRO BASE STATION FOR INTERFERENCE CONTROL

(75) Inventors: Won Jong Noh, Yongin-si (KR); Chang Yong Shin, Seoul (KR); Hyun Ho Choi, Suwon-si (KR); Won Jae Shin, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 185 days.

(21) Appl. No.: 13/194,266

(22) Filed: Jul. 29, 2011

(65) Prior Publication Data
US 2012/0034925 A1 Feb. 9, 2012

(30) Foreign Application Priority Data
Aug. 3, 2010 (KR) .................. 10-2010-0074901

(51) Int. Cl.
*H04W 36/00* (2009.01)
*H04W 36/30* (2009.01)
*H04W 36/08* (2009.01)
*H04W 72/00* (2009.01)
*H04W 28/04* (2009.01)
*H04W 88/08* (2009.01)

(52) U.S. Cl.
CPC ............. *H04W 36/30* (2013.01); *H04W 36/08* (2013.01); *H04W 72/00* (2013.01); *H04W 28/04* (2013.01); *H04W 88/08* (2013.01)
USPC .......................... 455/444; 455/436; 455/422.1

(58) Field of Classification Search
CPC ............ H04W 84/045; H04W 72/082; H04W 52/244; H04W 36/30; H04W 24/02; H04W 88/08; H04W 36/20; H04W 52/0206; H04W 52/146; H04W 48/06; H04W 60/04; H04W 72/0426; H04W 72/085; H04W 36/08; H04W 72/00; H04W 28/04
USPC ................. 370/252, 254, 326, 329, 331, 332; 455/422.1, 436, 440, 442, 444, 447, 455/449, 452.1, 452.2
See application file for complete search history.

(56) References Cited

U.S. PATENT DOCUMENTS

| | | | |
|---|---|---|---|
| 2008/0146154 A1 | 6/2008 | Claussen et al. | |
| 2009/0129341 A1* | 5/2009 | Balasubramanian et al. | 370/331 |
| 2009/0286545 A1 | 11/2009 | Yavuz et al. | |
| 2009/0296641 A1 | 12/2009 | Bienas et al. | |
| 2010/0015921 A1 | 1/2010 | Yavuz et al. | |
| 2010/0222069 A1* | 9/2010 | Abraham et al. | 455/452.2 |
| 2010/0284373 A1* | 11/2010 | Makino et al. | 370/332 |
| 2010/0285795 A1* | 11/2010 | Whinnett | 455/424 |
| 2011/0086641 A1* | 4/2011 | Guvenc et al. | 455/437 |
| 2012/0258724 A1* | 10/2012 | Kim et al. | 455/452.2 |

\* cited by examiner

*Primary Examiner* — Dinh P Nguyen
(74) *Attorney, Agent, or Firm* — Jefferson IP Law, LLP

(57) ABSTRACT

A communication method of a micro base station for interference control is provided. The communication method includes determining whether to perform a handover of macro user equipment from a macro base station to a micro base station based on interference from the macro user equipment served by the macro base station to micro user equipment served by the micro base station, searching for an index of a resource allocable to the macro user equipment, and transmitting, to the macro base station, a handover request message including the index of the resource allocable to the macro user equipment.

21 Claims, 7 Drawing Sheets

COMMUNICATION METHOD OF MACRO BASE STATION AND MICRO BASE STATION FOR INTERFERENCE CONTROL

PRIORITY

This application claims the benefit under 35 U.S.C. §119(a) of a Korean patent application filed on Aug. 3, 2010, in the Korean Intellectual Property Office and assigned Serial No. 10-2010-0074901, the entire disclosure of which is hereby incorporated by reference.

BACKGROUND

1. Field of the Invention

The present invention relates to a communication method of a base station. More particularly, the present invention relates to a communication method of a macro base station and a micro base station for interference control.

2. Description of Related Art

When macro user equipment served by a macro base station and micro user equipment served by a micro base station exist in the same heterogeneous cellular system, it is difficult to efficiently provide services to the user equipment due to interference between the macro user equipment and the micro user equipment for various reasons. Accordingly, there is a need to provide a method for improving communication in a system including a macro base station and a micro base station.

SUMMARY OF THE INVENTION

Aspects of the present invention are to address at least the above-mentioned problems and/or disadvantages and to provide at least the advantages described below. Accordingly, an aspect of the present invention is to provide a method for improving communication in a system including a macro base station and a micro base station.

In accordance with an aspect of the present invention, a communication method of a micro base station for interference control is provided. The communication method includes determining whether to perform a handover of macro user equipment from a macro base station to a micro base station based on interference from the macro user equipment served by the macro base station to micro user equipment served by the micro base station, searching for an index of a resource allocable to the macro user equipment, and transmitting, to the macro base station, a handover request message including the index of the resource allocable to the macro user equipment.

The searching for the index of the resource allocable to the macro user equipment may include calculating the resource allocable to the macro user equipment based on a resource allocated by the micro base station to the micro user equipment.

The communication method may further include receiving information about the interference.

The communication method may further include managing a list with respect to at least one macro user equipment causing interference with the micro user equipment.

The communication method may further include exchanging channel information with the macro base station before the determining of whether to perform the handover.

The communication method may further include periodically updating, to the macro base station, the index of the resource allocable, based on transmission latency between the macro base station and the micro base station identified through the channel information.

The index of the resource allocable to the macro user equipment may further include an index of a resource allocable by a Cooperated MultiPoint (CoMP) transmission and reception scheme performed on the macro user equipment by the micro base station and an adjacent base station that is adjacent to the micro base station.

The communication method may further include performing the handover of the macro user equipment based on an interference control mode determined by the macro base station, in response to the handover request message.

The interference control mode may include at least one of a first mode to perform the handover of the macro user equipment from the macro base station to the micro base station, a second mode to perform Inter-Cell Interference Coordination (ICIC) on the macro user equipment, a third mode to perform the handover from the macro base station to the micro base station and the ICIC on the macro user equipment, and a fourth mode to perform the CoMP scheme on the macro user equipment by the micro base station and an adjacent base station that is adjacent to the micro base station.

In accordance with another aspect of the present invention, a communication method of a macro base station for interference control is provided. The method includes receiving a handover request message including an index of a resource allocable to macro user equipment when a handover of the macro user equipment is performed from the macro base station to a micro base station, searching for an index of a resource used by the macro user equipment corresponding to a level of service quality used by the macro user equipment in response to the handover request message, and determining an interference control mode to resolve, using the index of the resource allocable to the macro user equipment and the index of the resource needed by the macro user equipment, interference by the macro user equipment.

The searching for the index of the resource used by the macro user equipment may include calculating first service quality of the macro user equipment before the handover of the macro user equipment, and calculating second service quality of the macro user equipment after the handover of the macro user equipment, and calculating the index of the resource used by the macro user equipment, based on the first service quality of the macro user equipment and the second service quality of the macro user equipment.

The index of the resource allocable to the macro user equipment may further include an index of a resource allocable by a CoMP scheme performed on the macro user equipment by the micro base station and an adjacent base station that is adjacent to the micro base station.

The interference control mode may include at least one of a first mode to perform the handover of the macro user equipment from the macro base station to the micro base station, a second mode to perform ICIC on the macro user equipment, a third mode to perform the handover from the macro base station to the micro base station and the ICIC on the macro user equipment, and a fourth mode to perform the CoMP scheme on the macro user equipment by the micro base station and an adjacent base station to the micro base station.

The communication method may further include transmitting the determined interference control mode to a micro base station including micro user equipment being interfered with by the macro user equipment and adjacent base stations that are adjacent to the micro base station.

The communication method may further include receiving a list with respect to at least one macro user equipment approaching micro user equipment from the micro base station and causing interference with the micro user equipment.

The communication method may further include exchanging channel information with the micro base station before the handover request message is received.

As described above, according to an aspect of the present invention, a handover and interference control method are performed based on an index of a resource allocable to each user equipment in a macrocell and a heterogeneous cell to improve communication quality with respect to heterogeneous cell users.

Other aspects, advantages, and salient features of the invention will be apparent to those skilled in the art from the following detailed description, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, like reference numerals will be understood to refer to the like parts, components, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
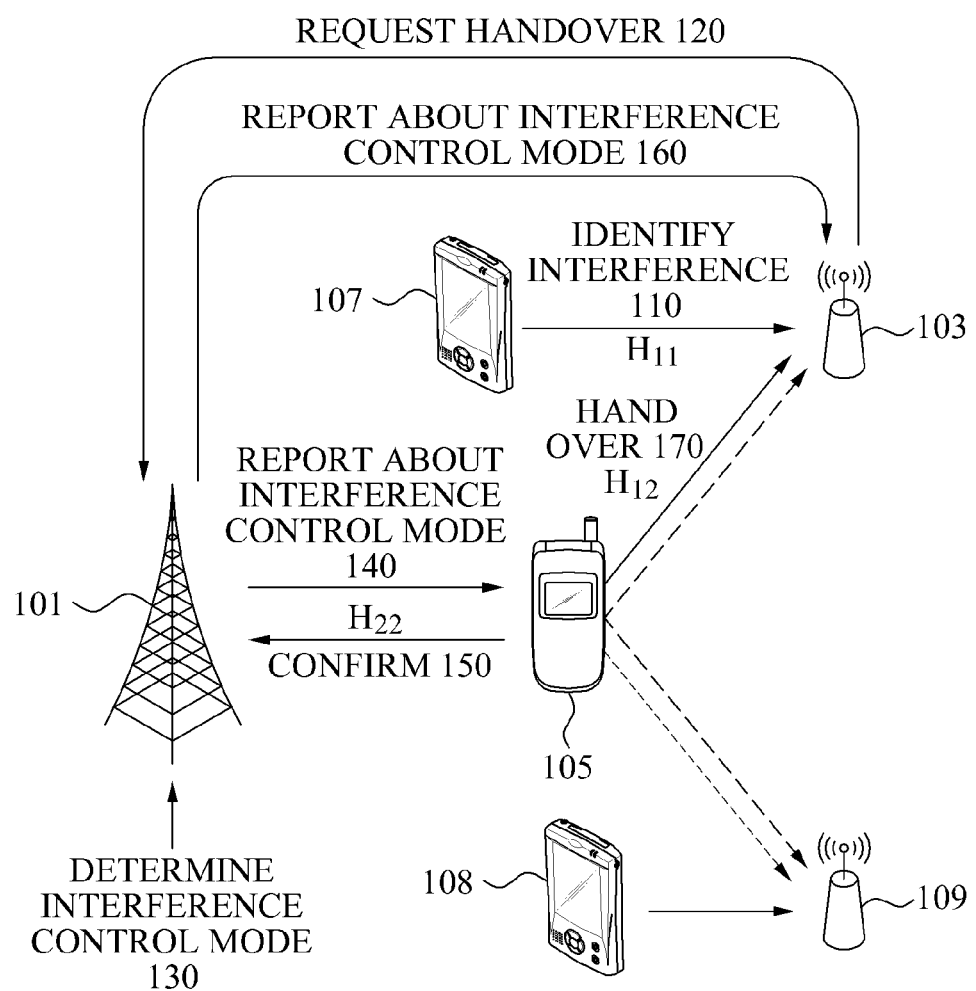
FIG. 1 illustrates a network of a heterogeneous cellular system for interference control according to an exemplary embodiment of the present invention.

FIG. 1 illustrates a network of a heterogeneous cellular system for interference control according to an exemplary embodiment of the present invention.

Referring to FIG. 1, the network includes a macro base station 101, a micro base station 103, macro user equipment 105, micro user equipment 107 and 108, and an adjacent base station 109 that is adjacent to the micro base station.

Each heterogeneous cell of the hetero cellular system may measure uplink channel gains of each user, interference channel gains, a total interference in the heterogeneous cell and a sum of noise in the heterogeneous cell through a pilot channel. Base stations in the heterogeneous cell, for example, the macro base station 101, the micro base station 103, and the adjacent base station 109 that is adjacent to the micro base station, are assumed to be connected to each other via a high-speed link.

The macro base station 101 serves the macro user equipment 105 in a macrocell and receives a handover request message with respect to the macro user equipment 105 from the micro base station 103. The macro base station 101 determines an interference control mode to resolve interference of the macro user equipment 105 with the micro user equipment 107 in response to the handover request message from the micro base station 103.

The micro base station 103 serves the micro user equipment 107 interfered with by the macro user equipment 105 and requests the macro base station 101 for a handover of the macro user equipment 105 to a microcell where the micro base station 103 is positioned based on an interference of the macro user equipment 105 with the micro user equipment 107.

The micro base station 103 may include, for example, a pico base station, a femto base station, and the like.

The macro user equipment 105 is served by the macro base station 101 and functions as a neighbor that causes interference to the adjacent micro user equipment 107.

The adjacent base station 109 that is adjacent to the micro base station 103 is a micro base station serving another micro user equipment 108 interfered with by the macro user equipment 105 and may perform Cooperated MultiPoint (CoMP) transmission/reception with the micro base station 103 to resolve interference of the macro user equipment 105 with the served micro user equipment 108.

Hereinafter, operations between the respective base stations and the user equipment to control interference by the macro user equipment will be described.

The micro base station 103 recognizes interference from the macro user equipment 105 served by the macro base station 101 to the micro user equipment 107 served by the micro base station 103 in operation 110.

The micro base station 103 determines whether to perform a handover of the macro user equipment 105 from the macro base station 101 to the micro base station 103 based on the recognized interference.

In order to decrease damage to the micro user equipment 107 severely interfered with by the macro user equipment 105, the micro base station 103 may share part of a radio resource of the micro base station 103 with the macro user equipment 105. When the micro base station 103 shares part of the radio resource with the macro user equipment 105 to induce the macro user equipment 105 to be handed over to the micro base station 103, the macro user equipment 105 does not cause interference with the micro user equipment 107, which results in additional gain.

When the micro base station 103 determines that there is a need for a handover of the macro user equipment 105 due to severe interference of the macro user equipment 105 with the micro user equipment 107, the micro base station 103 transmits, to the macro base station 101, a handover request message requesting the handover of the macro user equipment 105 in operation 120.

The handover request message may include field factors, for example, an index of a resource allocable to the macro user equipment 105, an IDentification (ID) of the macro user equipment 105, pricing variable information, Channel State Information (CSI), and the like.

Here, the index of the resource allocable to the macro user equipment 105 is an index representing a bandwidth of the micro base station 103 allocated to the macro user equipment 105 when the macro user equipment 105 is handed over to the micro base station 103. An exemplary method of the micro base station searching for the index of the resource allocated to the macro user equipment will be described with reference to FIG. 4.

The handover request message may further include an index of a resource allocable by a CoMP scheme, for example, a CoMP resource index, performed on the macro user equipment 105 by the micro base station 103 and the adjacent base station 109.

The micro base stations 103 and 109, which are cooperative, may share part of a bandwidth allocated thereto with the macro user equipment 105 causing interference in order to resolve interference of the macro user equipment 105 with the micro user equipments 107 and 108.

A bandwidth shared by the respective cooperative micro base stations 103 and 109 with the macro user equipment 105 may be determined by coordination between the micro base stations 103 and 109.

Even though the respective micro base stations 103 and 109 share a bandwidth with the macro user equipment 105 within an intended range through the coordination, the interference of the macro user equipment 105 with the micro user equipments 107 and 108 may be eliminated. Thus, the respective micro base stations 103 and 109 may provide better services to the micro user equipment 107 and 108 served by the micro base stations 103 and 109.

When the cooperative micro base stations 103 and 109 use a CoMP scheme, the coordination may be made through a back hole, and an overhead may occur for joint decoding of data with respect to the macro user equipment 105.

However, when the index of the resource allocable by the CoMP scheme, for example, a CoMP resource index, is used, a handover of the macro user equipment 105 may be induced even though a narrower bandwidth is shared than when the index of the resource allocable to the macro user equipment 105 found by the micro base station 103 is used.

The index of the resource allocable by the CoMP scheme may be determined, for example, by a representative value, by the cooperative micro base stations 103 and 109, and the macro base station 101 may interpret and use the index of the resource allocable by the CoMP scheme as necessary.

Resource allocation of cooperative base stations may be determined by various coordination methods between the micro base stations 103 and 109.

When a wider bandwidth than a bandwidth currently served by the macro base station 101 is allocated by the micro base stations 103 and 109, the macro user equipment 105 may be provided with a service that is better than a service currently provided by the macro base station 101.

The macro base station 101 determines an interference control mode to resolve the interference by the macro user equipment 105 in response to the handover request message received from the micro base station 103 in operation 130.

The macro base station 101 searches for an index of a resource used by the macro user equipment 105 corresponding to a level of service quality used by the macro user equipment 105 before the determination of the interference control mode. An exemplary method of the macro base station 101 searching for the index of the resource used by the macro user equipment 105 will be described below with reference to FIG. 5.

For example, there is a case where the macro base station 101 determines the interference control mode as a first mode in operation 130.

The macro base station 101 notifies the macro user equipment 105 causing interference with the micro user equipment 107 of the interference control mode determined by the macro base station 101, the first mode, in operation 140, and receives confirmation from the macro user equipment 105 in operation 150.

The macro base station 101 notifies the micro base station 103 of the interference control mode, the first mode, in operation 160, and hands over the macro user equipment 105 causing interference with the micro user equipment 107 to the micro base station 103 in the microcell in operation 170.

The interference control mode determined by the macro base station 101 using various indices to resolve interference by the macro user equipment 105 includes four types described in the following Table 1.

TABLE 1

| Interference control mode | Handover | ICIC | CoMP |
| --- | --- | --- | --- |
| First mode | ○ | X | X |
| Second mode | X | ○ | X |
| Third mode | ○ | ○ | X |
| Fourth mode | ○ | ○ | ○ |

The first mode performs a handover of the macro user equipment 105 from the macro base station 101 to the micro base station 103, and a second mode performs Inter-Cell Interference Coordination (ICIC) on the macro user equipment 105.

An interference control method based on the second mode may use, for example, a rate-split (power split) mode, Interference Alignment (IA), or the like.

A third mode performs a handover from the macro base station 101 to the micro base station 103 and ICIC on the macro user equipment 105.

A fourth mode performs CoMP, a handover, and ICIC on the macro user equipment 105 by the micro base station 103 and the adjacent base station 109.

Figure 2:
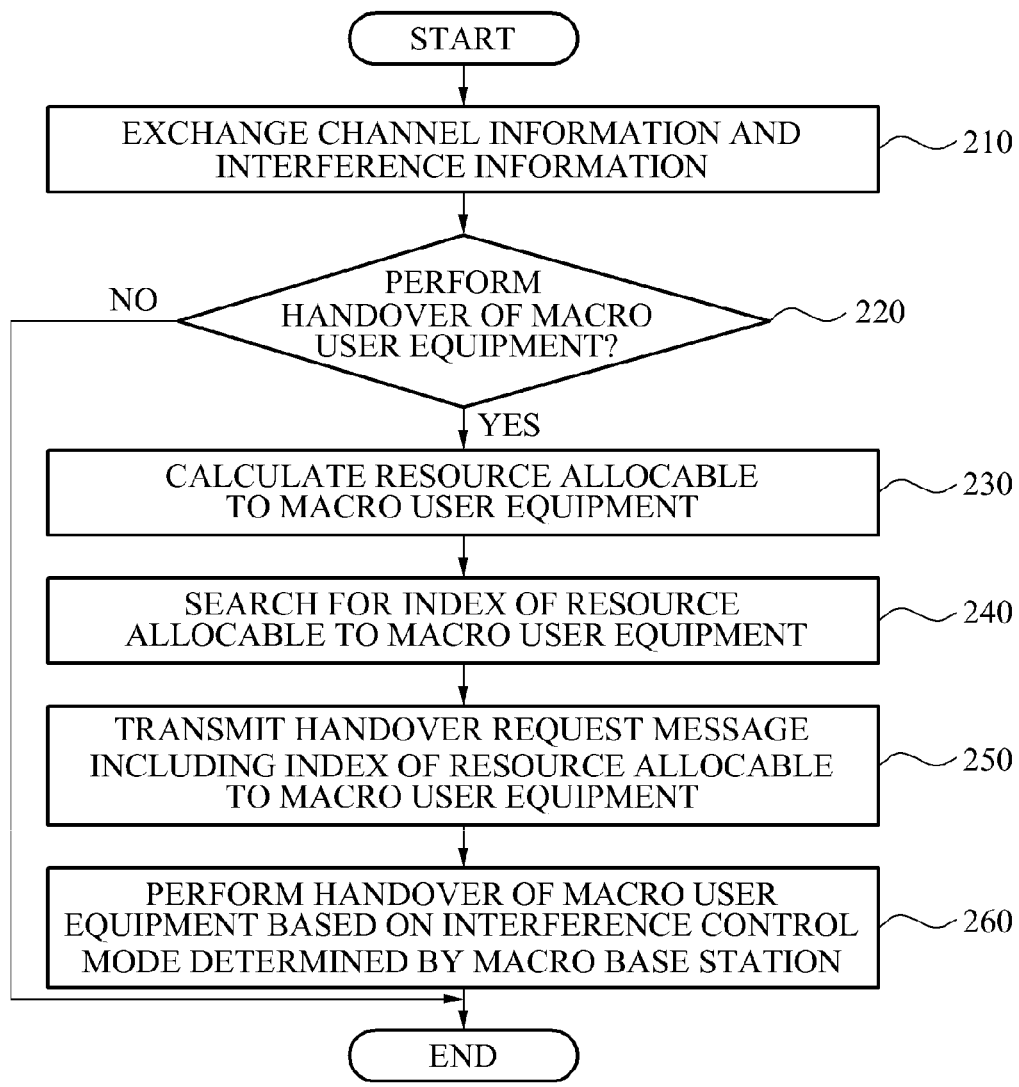
FIG. 2 is a flowchart illustrating a communication method of a micro base station for interference control according to an exemplary embodiment of the present invention.

FIG. 2 is a flowchart illustrating a communication method of a micro base station for interference control according to an exemplary embodiment of the present invention.

Referring to FIG. 2, the micro base station may exchange channel information and information about interference with a macro base station in operation 210.

The channel information may include a material and medium characteristics of an X2 backbone. The micro base station and the macro base station may identify information about a necessary time for transmission latency between the macro base station and the micro base station from the channel information. In addition, the channel information may include noise of a channel, interference information about a channel, and the like.

The interference information includes information about interference from macro user equipment to micro user equipment, for example, a Signal to Interference plus Noise Ratio (SINR) or a Signal to Noise Ratio (SNR) of the micro user equipment. In addition, the interference information may include information about various types of interference which may occur between the macro base station and the micro base station.

Prior to the exchange of the channel information and the interference information, the micro base station may perform synchronization with the macro base station and may exchange the channel information and the interference information between the macro base station and the micro base station in accordance with the synchronization.

The micro base station determines whether to perform a handover of the macro user equipment from the macro base station to the micro base station based on interference from the macro user equipment served by the macro base station to the micro user equipment served by the micro base station in operation 220.

The micro base station may identify interference information about the micro user equipment served by the micro base station, for example, an SINR, in order to determine whether to perform the handover of the macro user equipment to the micro base station.

When an SINR of the micro user equipment decreases to a predetermined value or less, the micro base station may identify the macro user equipment as a loud neighbor which causes strong interference with the micro user equipment.

In order to identify the loud neighbor which causes strong interference with the micro user equipment, the micro base station may perform synchronization with the macro base station in advance with respect to a system operation time and may measure channel information and a level of interference with a channel in accordance with an operating time in point of a Sounding Reference Signal (SRS) of the macro user equipment.

The micro base station may periodically or continuously manage, by itself, a list of at least one macro user equipment interfering with the micro user equipment, that is, causing strong interference with the micro user equipment, which is a loud neighbor. Further, the micro base station may periodically or continuously register the list of the at least one macro user equipment that is the loud neighbor to the macro base station.

The micro base station calculates a resource allocable to the macro user equipment based on a resource allocated to the micro user equipment by the micro base station in operation 230, and searches for an index of the resource allocable to the macro user equipment by the micro base station using a calculated result in operation 240.

An exemplary method of the micro base station searching for the index of the resource allocable to the macro user equipment will be described below with reference with FIG. 4.

The micro base station transmits, to the macro base station, a handover request message including the index of the resource allocable to the macro user equipment in operation 250.

The micro base station may perform a handover of the macro user equipment based on an interference control mode determined by the macro base station in response to the handover request message in operation 260.

Figure 3:
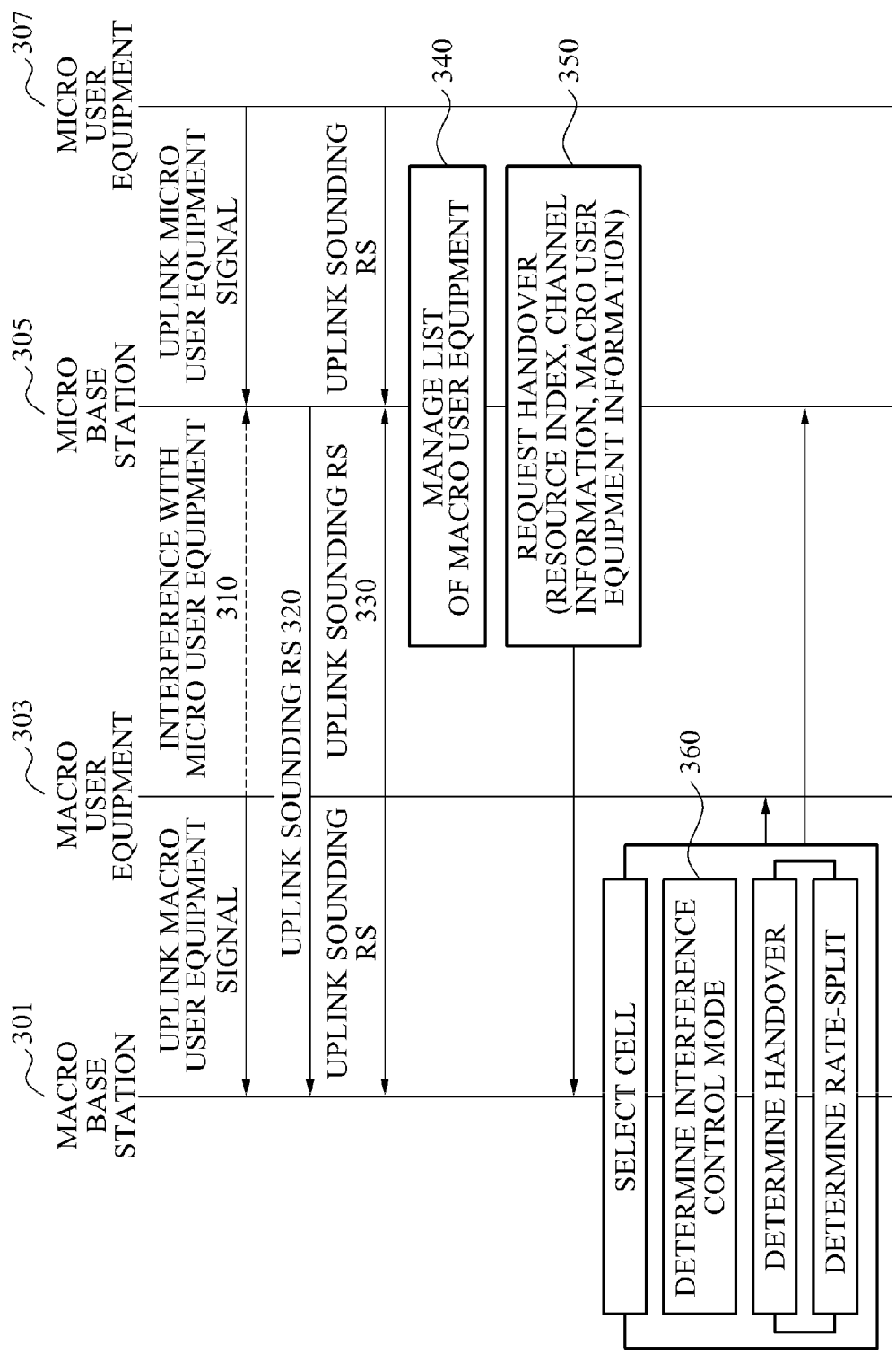
FIG. 3 illustrates interference control performed in a network of a heterogeneous cellular system according to an exemplary embodiment of the present invention.

FIG. 3 illustrates performance of an interference control in a network of a heterogeneous cellular system according to an exemplary embodiment of the present invention.

Referring to FIG. 3, the network of the heterogeneous cellular system includes a macro base station 301, macro user equipment 303, a micro base station 305, and micro user equipment 307.

The micro base station 305 may identify that the macro user equipment 303 causes interference with the micro user equipment 307 served by the micro base station 305 through an uplink signal from the macro user equipment 303 to the macro base station 301 and an uplink signal from the micro user equipment 307 to the micro base station 305 in operation 310.

Accordingly, the micro base station 305 requests an uplink SRS from the macro base station 301 in operation 320, and transmits and receives the uplink SRS to and from the macro base station 301 and the micro user equipment 307 in operation 330.

The micro base station 305 may obtain interference information from the micro user equipment 307 through the uplink SRS. Also, the micro base station 305 may obtain information about at least one macro user equipment 303 causing interference with the micro user equipment 307 from the macro base station 301 through the uplink SRS.

Further, the micro base station 305 may exchange channel information between the macro base station 301 and the micro base station 305 through the uplink SRS.

The micro base station 305 periodically updates, to the macro base station 301, the index of the allocable resource based on transmission latency between the macro base station 301 and the micro base station 305 identified through the channel information.

That is, when the transmission latency between the macro base station 301 and the micro base station 305 identified through the channel information is long, the micro base station 305 may, for example, use the index of the resource allocable to the macro user equipment 303, averaged for a long term, for a predetermined period of time. That is, the micro base station 305 updates the index of the resource allocable to the macro user equipment 303 periodically, for example, in each predetermined time unit, so that the macro base station 301 may use the same index, the index of the resource allocable to the macro user equipment 303 averaged for the long term, for the predetermined period of time.

When the transmission latency between the macro base station 301 and the micro base station 305 identified through the channel information is short, the micro base station 305 may transmit the index of the resource allocable to the macro user equipment 303 in real time.

The micro base station 305 may periodically or continuously manage the list of the at least one macro user equipment 303 causing interference with the micro user equipment 307 through the information identified by the uplink SRS in operation 340.

The micro base station 305 may request, from the macro base station 301, a handover of the macro user equipment 303 causing interference with the micro user equipment 307 to a microcell of the micro base station 305 based on the list of the at least one macro user equipment 303 causing interference with the micro user equipment 307 in operation 350.

The micro base station 305 requests the handover in response to the handover request message, and the handover request message may include the index of the resource allocable to the macro user equipment 303, channel information, and information about the macro user equipment 303, for example, an ID.

In addition to the index of the resource allocable to the macro user equipment 303, the micro base station 305 may further include, in the handover request message, an index of a resource allocable by CoMP performed on the macro user equipment 303 by the micro base station 305 and an adjacent base station which is adjacent to the micro base station 305.

In operation 360, the macro base station 301 may determine an interference control mode using the index of the resource allocable to the macro user equipment 303 and an index of a resource used by the macro user equipment 303 found by the macro base station 301, which are included in the handover request message received from the micro base station 305.

When the interference control mode is determined, the macro base station 301 may also use the index of the resource allocable by CoMP performed on the macro user equipment 303 by the micro base station 305 and the adjacent base station, which is received from the micro base station 305.

Figure 4:
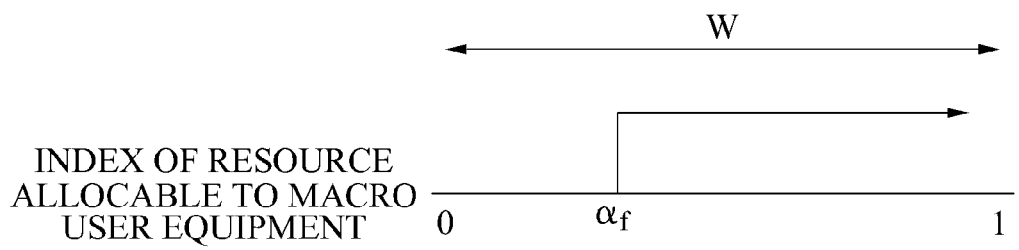
FIG. 4 illustrates searching for an index of a resource allocable to macro user equipment according to an exemplary embodiment of the present invention.

FIG. 4 illustrates searching for an index of a resource allocable to macro user equipment according to an exemplary embodiment of the present invention.

Referring to FIGS. 1 to 4, a micro base station may allocate part of a resource allocated to the micro base station, for example, a bandwidth W, to macro user equipment causing interference with micro user equipment served by the micro base station.

Here, an index representing a minimum bandwidth allocated to the micro user equipment, that is, an index $\alpha_f$ of a resource allocable to the macro user equipment, is an index representing a maximum extent of a bandwidth shared by the micro base station with the macro user equipment in order to provide a higher-quality service, for example, a higher transmission rate, than currently provided to the micro user equipment served by the micro base station.

The index $\alpha_f$ of the resource allocable to the macro user equipment may be calculated by the following Equation 1.

$$\alpha_f = \min\left\{\alpha : \left(1 + \frac{|h_{11}|^2 P_1}{\alpha \sigma_f^2}\right)^\alpha > \left(1 + \frac{|h_{11}|^2 P_1}{|h_{21}|^2 P_2 + \sigma_f^2}\right)\right\} \quad \text{Equation 1}$$

Here, $h_{11}$ represents a channel from the micro user equipment to the micro base station, $h_{21}$ represents a channel from the micro user equipment to the macro base station, $P_1$ represents a power of the micro user equipment, and $P_2$ represents a power of the macro user equipment.

Further, $\sigma_f^2$ represents a noise or interference from the micro base station and all adjacent users, and a represents a ratio to a bandwidth.

The index representing the minimum bandwidth allocated to the micro user equipment, that is, the index $\alpha_f$ of the resource allocable to the macro user equipment, represents a minimum value to make service quality of the micro user equipment, for example, a transmission rate, after a handover better than service quality before the handover.

Since interference may be eliminated even though the micro base station shares the bandwidth with the macro user equipment within a range of the index $\alpha_f$ of the resource allocable to the macro user equipment, the micro user equipment may be provided with a better service.

Figure 5:
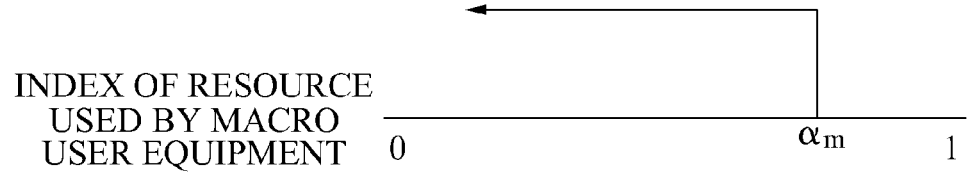
FIG. 5 illustrates searching for an index of a resource used by macro user equipment according to an exemplary embodiment of the present invention.

FIG. 5 illustrates searching for an index of a resource used by macro user equipment according to an exemplary embodiment of the present invention.

Referring to FIGS. 1 to 5, a macro base station may calculate the index of the resource used by the macro user equipment served by the macro base station by the following Equation 2.

$$\alpha_m = \max\left\{\alpha : \left(1 + \frac{|h_{12}|^2 P_2}{(1-\alpha)\sigma_f^2}\right)^{(1-\alpha)} > \left(1 + \frac{|h_{22}|^2 P_2}{\sigma_m^2}\right)\right\} \quad \text{Equation 2}$$

Here, $h_{12}$ represents a channel from the macro user equipment to a micro base station, $h_{22}$ represents a channel from the macro user equipment to the macro base station, $P_2$ represents a power of the macro user equipment, $\sigma_f^2$ represents a noise of the micro base station, and $\sigma_m^2$ represents a noise of the macro base station and a noise or interference in the macro user equipment from surroundings. $\alpha$ represents a ratio to a bandwidth.

The index $\alpha_m$ of the resource used by the macro user equipment denotes a minimum bandwidth allocated to the macro user equipment by the micro base station to serve the macro user equipment after a handover in order that the macro user equipment causing interference with micro user equipment may be provided with a higher-quality service than currently provided by the macro base station.

The macro user equipment may use a network service with at least better service quality than that currently provided by the macro base station when a wider bandwidth than the index $\alpha_m$ of the resource used by the macro user equipment is allocated by the micro base station.

Figure 6:
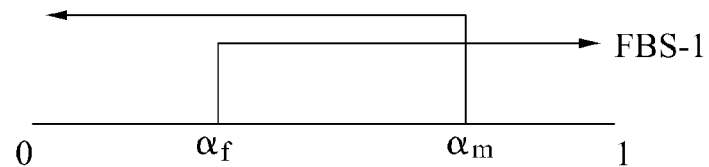
FIG. 6 illustrates a first mode to perform a handover among interference control modes according to an exemplary embodiment of the present invention.

FIG. 6 illustrates a first mode to perform a handover among interference control modes according to an exemplary embodiment of the present invention.

Referring to FIG. 6, the first mode is a mode to perform a handover of macro user equipment from a macro base station to a micro base station.

An index with respect to a minimum bandwidth allocated by a micro base station FBS-1 to micro user equipment served by the micro base station FBS-1, that is, an index of a resource allocable by the micro base station to the macro user equipment, is $\alpha_f$. Further, an index of a resource used by the macro user equipment corresponding to a level of service quality used by the macro user equipment is $\alpha_m$.

When a bandwidth between the index $\alpha_f$ of the resource allocable to the macro user equipment and the index $\alpha_m$ of the resource used by the macro user equipment is provided to the macro user equipment, the macro base station determines an interference control mode as the first mode and performs a handover of the macro user equipment from the macro base station to the micro base station.

The macro base station may select, as the micro base station to which the handover is performed based on the first mode, a micro base station having an index of a lowest resource or a micro base station having an index gap of a highest resource, for example, a gap between the index $\alpha_f$ of the resource allocable to the macro user equipment by the micro base station and the index $\alpha_m$ of the resource used by the macro user equipment.

Further, according to an exemplary implementation, in the handover, the macro base station may determine how to split an extent of a resource represented by the index $\alpha_f$ of the resource allocable by the micro base station to the macro user equipment and the index $\alpha_m$ of the resource used by the macro user equipment through an index $\alpha^*$ representing an extent of a resource split in the handover.

When the macro user equipment is handed over to the micro base station, the index $\alpha^*$ representing an extent of a resource split to the macro user equipment and the micro user equipment may be calculated by splitting the resource, for example, a rate, so that satisfaction of a user using the macro user equipment and a user using the micro user equipment is maximum, as shown in Equation 3. Further, the index $\alpha^*$ may be calculated by splitting the resource so that effective gains of the macro user equipment and effective gains of the micro user equipment become the same in the handover, as shown in Equation 4.

$$\alpha^* = \arg\max_{\alpha_m \le \alpha \le \alpha_f} [U_f(\alpha) + U_m(\alpha)] \quad \text{Equation 3}$$

Here, $U_f(a)$ is a utility function with respect to the micro user equipment, which represents satisfaction of the user of the micro user equipment. $U_m(a)$ is a utility function with respect to the macro user equipment, which represents satisfaction of the user of the macro user equipment.

$$\alpha^* = \frac{\mu_f \alpha_f + \mu_m \alpha_m}{\mu_f + \mu_m} (\mu_f(\alpha_f - \alpha^*) = \mu_m(\alpha^* - \alpha_m)) \quad \text{Equation 4}$$

Here, $\mu_f$ is a utility increase of the micro user equipment with respect to a unit of the resource, that is, an effective increase in the micro user equipment, and $\mu_m$ is a utility increase of the macro user equipment with respect to a unit of the resource, that is, an effective increase in the macro user equipment.

Figure 7:
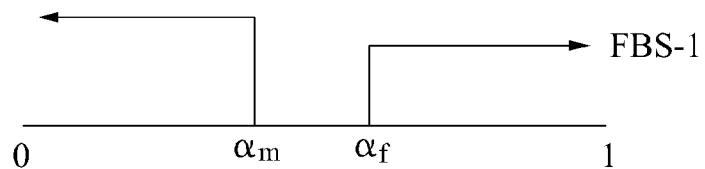
FIG. 7 illustrates a second mode to perform interference control among interference control modes according to an exemplary embodiment of the present invention.

FIG. 7 illustrates a second mode to perform ICIC among interference control modes according to an exemplary embodiment of the present invention.

Referring to FIG. 7, the second mode performs ICIC on macro user equipment and may include a rate-split mode, a power split mode, and the like.

When there is no region which satisfies an index $\alpha_f$ of a resource allocable by a micro base station to the macro user equipment and an index $\alpha_m$ of a resource used by the macro user equipment, a macro base station does not perform a handover of the macro user equipment but performs ICIC on a micro base station of micro user equipment interfered with to decrease interference with the micro user equipment.

The macro base station may perform ICIC on a micro base station displaying an index of the highest resource among a plurality of micro base stations, that is, a micro base station where micro user equipment interfered with the most by the macro user equipment is positioned.

Figure 8:
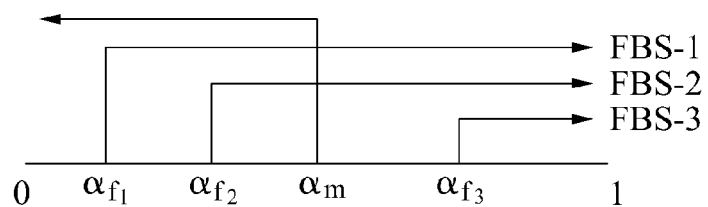
FIG. 8 illustrates a third mode to perform a handover and interference control among interference control modes according to an exemplary embodiment of the present invention.

FIG. 8 illustrates a third mode to perform a handover and ICIC among interference control modes according to an exemplary embodiment of the present invention.

There is a case where a micro base station serving micro user equipment interfered with by macro user equipment includes a micro base station 1 FBS-1, a micro base station 2 FBS-2, and a micro base station 3 FBS-3.

Referring to FIG. 8, a macro base station may determine an interference control mode as the third mode when the macro user equipment causes interference with a plurality of micro user equipment served by a plurality of micro base stations, respectively.

The macro base station may perform the third mode using indices $\alpha_{f1}$, $\alpha_{f2}$, and $\alpha_{f3}$ with respect to a minimum bandwidth allocated by the micro base stations FBS-1, FBS-2, and FBS-3 to the micro user equipment respectively served by the micro base stations FBS-1, FBS-2, and FBS-3 and using an index $\alpha_m$ of a resource used by the macro user equipment corresponding to a level of service quality used by the macro user equipment.

Here, a micro base station to which a handover is performed is the micro base station 1 FBS-1 displaying an index of the lowest resource, described above with reference to FIG. 6, and a micro base station to perform ICIC is the micro base station FBS-3 displaying an index of the highest resource, described above with reference to FIG. 7.

Figure 9:
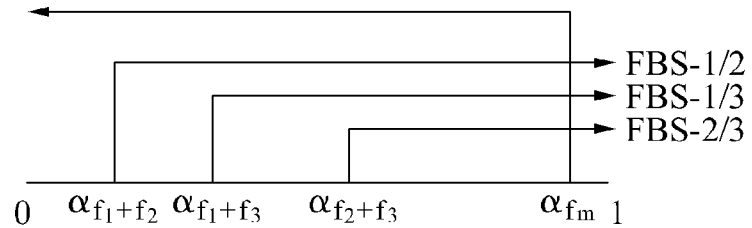
FIG. 9 illustrates a fourth mode to perform Cooperated MultiPoint transmission and reception among interference control modes according to an exemplary embodiment of the present invention.

FIG. 9 illustrates a fourth mode to perform CoMP among interference control modes according to an exemplary embodiment of the present invention.

Here, there is a case where micro base stations that may perform CoMP with each other in order to resolve interference by macro user equipment include a micro base station 1 FBS-1, a micro base station 2 FBS-2, and a micro base station 3 FBS 3.

A macro base station may select a cell combination having a lowest sum of indices of resources among a cell displaying an index of the lowest resource and a cooperative cell in order to determine a cell to which a handover is performed among the micro base stations performing CoMP.

Referring to FIG. 9, a sum $\alpha_{f1+f2}$ of indices of resources of the micro base station 1 FBS-1 and the micro base station 2 FBS-2 is the lowest, and thus the macro base station may perform ICIC, a handover, and CoMP using the micro base station 1 FBS-1 and the micro base station 2 FBS-2.

Here, the macro base station may perform the fourth mode using an index of a resource allocable by CoMP included in a handover request message received from a micro base station.

Figure 10:
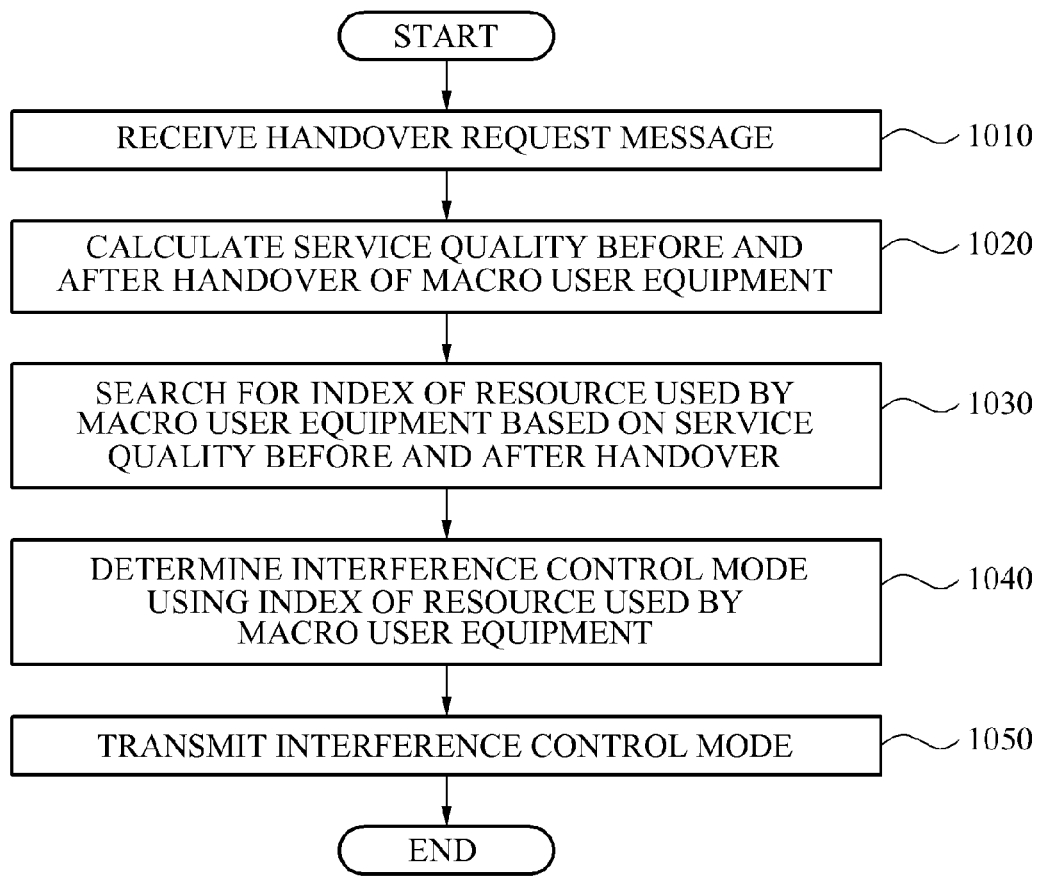
FIG. 10 is a flowchart illustrating a communication method of a macro base station for interference control according to an exemplary embodiment of the present invention.

FIG. 10 is a flowchart illustrating a communication method of a macro base station for interference control according to an exemplary embodiment of the present invention.

Referring to FIG. 10, the macro base station receives a handover request message including an index of a resource allocable to macro user equipment when the macro user equipment is handed over from the macro base station to a micro base station in operation 1010.

The index of the resource allocable to the macro user equipment may include an index of a resource allocable by CoMP performed on the macro user equipment by the micro base station and an adjacent base station which is adjacent to the micro base station.

Before the reception of the handover request message, the macro base station may exchange channel information with the micro base station. Further, the macro base station may periodically or continuously receive, from the micro base station, a list of at least one macro user equipment that is adjacent to micro user equipment and causing interference with the micro user equipment.

The macro base station receiving the handover request message may calculate first service quality of the macro user equipment before the handover of the macro user equipment and second service quality of the macro user equipment after the handover of the macro user equipment in operation 1020.

The macro base station may calculate an index of a resource used by the macro user equipment, based on the first service quality of the macro user equipment and the second service quality of the macro user equipment.

The macro base station searches for the index of the resource used by the macro user equipment corresponding to a level of service quality used by the macro user equipment in response to the handover request message in operation 1030.

An exemplary method of the macro base station searching for the index of the resource used by the macro user equipment is described above with reference to FIG. 5.

The macro base station determines an interference control mode to resolve interference by the macro user equipment using the index of the resource allocable to the macro user equipment and the index of the resource used by the macro user equipment in operation 1040.

The interference control mode is described above with reference to Table 1.

When the macro user equipment is closer to the micro base station, the macro base station may perform the first mode to perform the handover of the macro user equipment from the macro base station to the micro base station instead of performing the second mode to perform interference control on the macro user equipment.

In operation 1050, the macro base station may transmit the determined interference control mode to the micro base station including the micro user equipment interfered with by the macro user equipment and adjacent base stations which are adjacent to the micro base station.

The processes, functions, methods and/or software described above including a communication method of a macro base station and a micro base station for interference control may be recorded, stored, or fixed in one or more non-transitory computer-readable storage media that includes program instructions to be implemented by a computer to cause a processor to execute or perform the program instructions. The media may also include, alone or in combination with the program instructions, data files, data structures, and the like. The media and program instructions may be those specially designed and constructed, or they may be of the kind well-known and available to those having skill in the computer software arts. Examples of non-transitory computer-readable media include magnetic media such as hard disks, floppy disks, and magnetic tape, optical media such as CD ROM disks and DVDs, magneto-optical media such as optical disks, and hardware devices that are specially configured to store and perform program instructions, such as Read-Only Memory (ROM), Random Access Memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations and methods described above, or vice versa.

Figure 11:
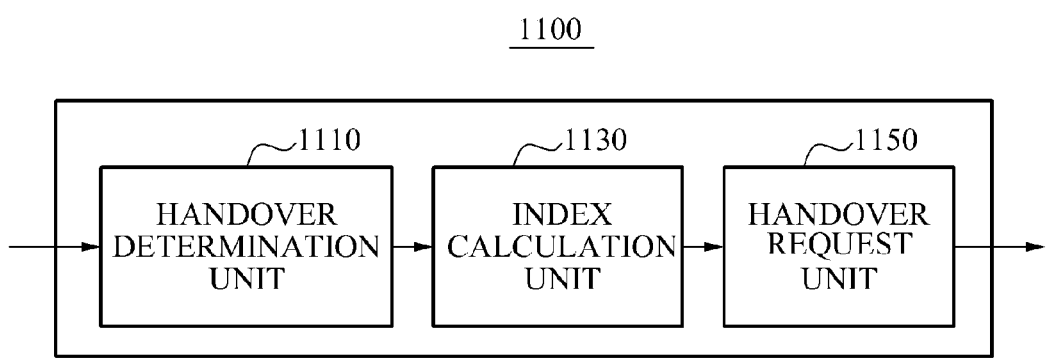
FIG. 11 is a block diagram of a micro base station for interference control according to an exemplary embodiment of the present invention.

FIG. 11 is a block diagram of a micro base station for interference control according to an exemplary embodiment of the present invention.

Referring to FIG. 11, the micro base station 1100 includes a handover determination unit 1110, an index calculation unit 1130, and a handover request unit 1150.

The handover determination unit 1110 determines whether to perform a handover of macro user equipment from a macro base station to the micro base station 1100 based on interference from the macro user equipment served by the macro base station to micro user equipment served by the micro base station 1100.

The index calculation unit 1130 calculates a resource allocable to the macro user equipment based on a resource allocated to the micro user equipment by the micro base station 1100 to obtain an index of the resource allocable to the macro user equipment.

The handover request unit 1150 transmits, to the macro base station, a handover request message including the index of the resource allocable to the macro user equipment.

The handover request message may include, in addition to the index of the resource allocable to the macro user equipment, an index of a resource allocable by CoMP performed on the macro user equipment by the micro base station 1100 and an adjacent base station that is adjacent to the micro base station 1100, pricing variable information, information about the macro user equipment, CSI, a list of micro base stations to perform CoMP, and the like.

Figure 12:
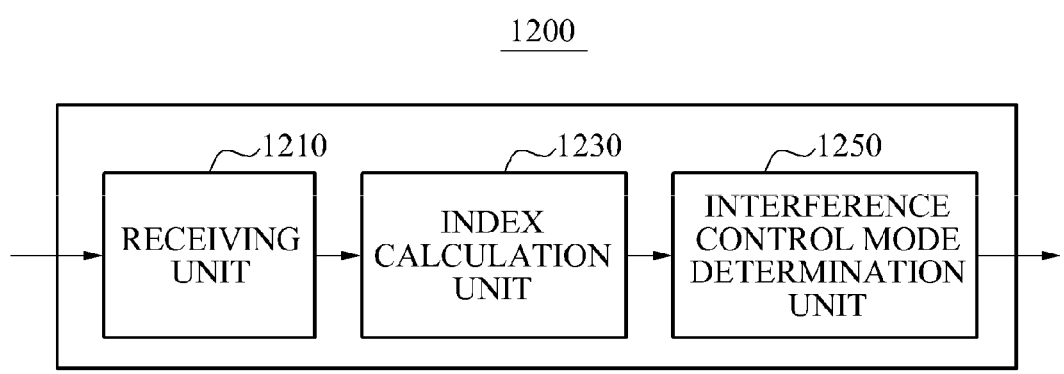
FIG. 12 is a block diagram of a macro base station for interference control according to an exemplary embodiment of the present invention.

FIG. 12 is a block diagram of a macro base station for interference control according to an exemplary embodiment of the present invention.

Referring to FIG. 12, the macro base station 1200 includes a receiving unit 1210, an index calculation unit 1230, and an interference control mode determination unit 1250.

The receiving unit 1210 receives a handover request message from a micro base station serving micro user equipment interfered with by macro user equipment causing interference with the micro user equipment.

The handover request message includes an index of a resource allocable to the macro user equipment when the macro user equipment is handed over from the macro base station to the micro base station.

The index of the resource allocable to the macro user equipment may include an index of a resource allocable by CoMP performed on the macro user equipment by the micro base station and an adjacent base station which is adjacent to the micro base station.

The index calculation unit 1230 calculates an index of a resource used by the macro user equipment corresponding to a level of service quality used by the macro user equipment in response to the handover request message.

The index calculation unit 1230 may calculate first service quality of the macro user equipment before the handover of the macro user equipment and second service quality of the macro user equipment after the handover of the macro user equipment, and may calculate the index of the resource used by the macro user equipment, based on the first service quality of the macro user equipment and the second service quality of the macro user equipment.

The interference control mode determination unit 1250 determines an interference control mode to resolve interference by the macro user equipment using the index of the resource allocable to the macro user equipment and the index of the resource used by the macro user equipment. Further, the interference control mode determination unit 1250 may determine the interference control mode using an index of a resource allocable by CoMP performed on the macro user equipment by the micro base station and an adjacent base station which is adjacent to the micro base station.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A communication method of a micro base station for interference control, the communication method comprising:
determining whether to perform a handover of macro user equipment from a macro base station to a micro base station based on interference from the macro user equipment served by the macro base station to micro user equipment served by the micro base station;
searching for an index of a resource allocable to the macro user equipment;
transmitting, to the macro base station, a handover request message including the index of the resource allocable to the macro user equipment;
receiving an indication as to an interference control mode determined by the macro base station; and
performing the handover of the macro user equipment based on the received indication, in response to the handover request message,
wherein the macro base station selects the interference control mode from among at least four interference control modes comprising a first mode to perform the handover of the macro user equipment from the macro base station to the micro base station, a second mode to perform Inter-Cell Interference Coordination (ICIC) on the macro user equipment, a third mode to perform the handover from the macro base station to the micro base station and the ICIC on the macro user equipment, and a fourth mode to perform a Cooperated MultiPoint (CoMP) scheme on the macro user equipment by the micro base station and an adjacent base station that is adjacent to the micro base station.

2. The communication method of claim 1, wherein the searching for the index of the resource allocable to the macro user equipment comprises calculating the resource allocable to the macro user equipment based on a resource allocated by the micro base station to the micro user equipment.

3. The communication method of claim 2, wherein the calculating of the resource allocable to the macro user equipment comprises using the following equation:

$$\alpha_f = \min\left\{\alpha : \left(1 + \frac{|h_{11}|^2 P_1}{\alpha \sigma_f^2}\right)^\alpha > \left(1 + \frac{|h_{11}|^2 P_1}{|h_{21}|^2 P_2 + \sigma_f^2}\right)\right\}$$

where, $h_{11}$ represents a channel from the micro user equipment to the micro base station, $h_{21}$ represents a channel from the micro user equipment to the macro base station, $P_1$ represents a power of the micro user equipment, $P_2$ represents a power of the macro user equipment, $\sigma_f^2$ represents one of noise and interference from the micro base station and all adjacent users, and $\alpha$ represents a ratio to a bandwidth.

4. The communication method of claim 1, further comprising receiving information about the interference.

5. The communication method of claim 1, further comprising managing a list with respect to at least one macro user equipment causing interference with the micro user equipment.

6. The communication method of claim 1, further comprising exchanging channel information with the macro base station before the determining of whether to perform the handover.

7. The communication method of claim 6, further comprising periodically updating, to the macro base station, the index of the resource allocable, based on transmission latency between the macro base station and the micro base station identified through the channel information.

8. The communication method of claim 1, wherein the index of the resource allocable to the macro user equipment further comprises an index of a resource allocable by a CoMP transmission and reception scheme performed on the macro user equipment by the micro base station and an adjacent base station that is adjacent to the micro base station.

9. A communication method of a macro base station for interference control, the communication method comprising:
receiving a handover request message including an index of a resource allocable to macro user equipment when a handover of the macro user equipment is performed from the macro base station to a micro base station;
searching for an index of a resource used by the macro user equipment corresponding to a level of service quality used by the macro user equipment in response to the handover request message;
determining an interference control mode to resolve, using the index of the resource allocable to the macro user equipment and the index of the resource needed by the macro user equipment, interference by the macro user equipment; and
transmitting an indication as to an interference control mode determined by the macro base station,
wherein the macro base station selects the interference control mode from among at least four interference control modes comprising a first mode to perform the handover of the macro user equipment from the macro base station to the micro base station, a second mode to perform Inter-Cell Interference Coordination (ICIC) on the macro user equipment, a third mode to perform the handover from the macro base station to the micro base station and the ICIC on the macro user equipment, and a fourth mode to perform a Cooperated MultiPoint (CoMP) scheme on the macro user equipment by the micro base station and an adjacent base station that is adjacent to the micro base station.

10. The communication method of claim 9, wherein the searching for the index of the resource used by the macro user equipment comprises:
calculating first service quality of the macro user equipment before the handover of the macro user equipment;
calculating second service quality of the macro user equipment after the handover of the macro user equipment; and
calculating the index of the resource used by the macro user equipment, based on the first service quality of the macro user equipment and the second service quality of the macro user equipment.

11. The communication method of claim 10, wherein calculating of the index of the resource used by the macro user equipment comprises using the following equation:

$$\alpha_m = \max\left\{\alpha : \left(1 + \frac{|h_{12}|^2 P_2}{(1-\alpha)\sigma_f^2}\right)^{(1-\alpha)} > \left(1 + \frac{|h_{22}|^2 P_2}{\sigma_m^2}\right)\right\}$$

where $h_{12}$ represents a channel from the macro user equipment to the micro base station, $h_{22}$ represents a channel from the macro user equipment to the macro base station, $P_2$ represents a power of the macro user equipment, $\sigma_f^2$ represents a noise of the micro base station, $\sigma_m^2$ represents a noise of the macro base station and one of a noise and interference in the macro user equipment from surroundings, and $\alpha$ represents a ratio to a bandwidth.

12. The communication method of claim 9, wherein the index of the resource allocable to the macro user equipment further comprises an index of a resource allocable by CoMP transmission and reception scheme performed on the macro user equipment by the micro base station and an adjacent base station that is adjacent to the micro base station.

13. The communication method of claim 9, further comprising transmitting the determined interference control mode to a micro base station including micro user equipment being interfered with by the macro user equipment and adjacent base stations that are adjacent to the micro base station.

14. The communication method of claim 9, further comprising receiving a list with respect to at least one macro user equipment approaching micro user equipment from the micro base station and causing interference with the micro user equipment.

15. The communication method of claim 9, further comprising exchanging channel information with the micro base station before the handover request message is received.

16. A non-transitory computer-readable medium comprising a program for instructing a computer to perform the method of claim 1.

17. The communication method of claim 1, wherein the determining whether to perform the handover of user equipment is performed by the micro base station.

18. The communication method of claim 17, wherein the determining whether to perform the handover of macro user equipment comprises:

determining, by the micro base station, an interference experienced by the micro user equipment served by the micro base station that is caused by the macro user equipment.

19. The communication method of claim 17, further comprising:

in response to the macro base station receiving the handover request message, calculating, by the macro base station, a service quality before handover of the macro user equipment and an expected service quality after handover of the macro user equipment.

20. The communication method of claim 1, wherein the receiving of the indication as to the interference control mode further comprises:

receiving an indication as to a micro user equipment interfered with by the macro user equipment, and receiving an indication as to adjacent base stations which are adjacent to the micro base station.

21. The communication method of claim 9, wherein the transmitting of the indication as to the interference control mode further comprises:

transmitting an indication as to a micro user equipment interfered with by the macro user equipment, and transmitting an indication as to adjacent base stations which are adjacent to the micro base station.

* * * * *